(12) United States Patent
Funayama (10) Patent No.: US 8,094,963 B2
(45) Date of Patent: Jan. 10, 2012

(54) IMAGING SYSTEM, IMAGING CONDITION SETTING METHOD, TERMINAL AND SERVER USED FOR THE SAME

(75) Inventor: Chisato Funayama, Tokyo (JP)

(73) Assignee: NEC Corporation, Tokyo (JP)

( * ) Notice: Subject to any disclaimer, the term of this patent is extended or adjusted under 35 U.S.C. 154(b) by 992 days.

(21) Appl. No.: 11/662,025

(22) PCT Filed: Sep. 7, 2005

(86) PCT No.: PCT/JP2005/016386
§ 371 (c)(1),
(2), (4) Date: Mar. 6, 2007

(87) PCT Pub. No.: WO2006/028109
PCT Pub. Date: Mar. 16, 2006

(65) Prior Publication Data
US 2008/0095434 A1    Apr. 24, 2008

(30) Foreign Application Priority Data
Sep. 7, 2004  (JP) .................................. 2004-259583

(51) Int. Cl.
*G06K 9/40*  (2006.01)
(52) U.S. Cl. ........ 382/274; 382/100; 382/167; 382/182; 382/254
(58) Field of Classification Search .................. 382/100, 382/167, 254, 274; 348/211, 231; 396/155
See application file for complete search history.

(56) References Cited

U.S. PATENT DOCUMENTS

| | | | | |
|---|---|---|---|---|
| 5,335,072 A | * | 8/1994 | Tanaka et al. | 348/231.3 |
| 2004/0155971 A1 | * | 8/2004 | Sharma et al. | 348/239 |
| 2004/0174434 A1 | * | 9/2004 | Walker et al. | 348/211.3 |
| 2006/0269270 A1 | * | 11/2006 | Yoda et al. | 396/155 |

FOREIGN PATENT DOCUMENTS

| | | |
|---|---|---|
| JP | 5-7329 | 1/1993 |
| JP | 5-49034 | 2/1993 |
| JP | 5-308563 | 11/1993 |
| JP | 2002-10114 | 1/2002 |
| JP | 2003-153296 | 5/2003 |
| JP | 2003-244528 | 8/2003 |
| JP | 2003-244709 | 8/2003 |
| JP | 2003-244709 A * | 8/2003 |
| JP | 2003-281511 | 10/2003 |
| JP | 2004-005534 | 1/2004 |
| JP | 2004-080359 | 3/2004 |
| JP | 2005-328271 | 11/2005 |

OTHER PUBLICATIONS

Japanese Official Action dated Apr. 6, 2011 together with a partial English language translation from JP 2006-535770.

* cited by examiner

Primary Examiner — Tom Y Lu
(74) Attorney, Agent, or Firm — Scully, Scott, Murphy & Presser, PC (57) ABSTRACT

An imaging unit (1) images an object to be imaged and acquires image data. On the other hand, an imaging information acquisition unit (2) acquires imaging information as information during imaging. A storage unit (3) contains optimal imaging condition information induced from the imaging information. An imaging information analysis unit (4) analyzes the imaging information given from the imaging information acquisition unit (2) and reads out imaging condition information optimal for imaging from the storage unit (3). An imaging condition setting unit (5) sets the imaging condition of the imaging unit (1) according to the imaging condition information obtained by the imaging condition information acquisition unit (4).

9 Claims, 10 Drawing Sheets

IMAGING SYSTEM, IMAGING CONDITION SETTING METHOD, TERMINAL AND SERVER USED FOR THE SAME

APPLICABLE FIELD IN THE INDUSTRY

The present invention relates to a technology of an imaging, and more particularly to an imaging system for obtaining information associated with imaging object or imaging situation, based upon the information, setting the imaging condition under the imaging object or the imaging situation to the imaging means, for example, camera etc. and a method, and a terminal, a server, etc. used for the same.

BACKGROUND ART

Conventionally, there exists a technology of appropriately regulating the setting of an iris, a shutter speed, a white balance, etc. before imaging, depending upon an imaging target (a figure/flower) or a state (outdoor scene/night scene) of an object for the purpose of obtaining an appropriate photo image, irrespective of a silver salt film camera or a digital camera. Such a technology is called a scene select, and for example, in a case of imaging a sport, upon selecting a mode of a sport scene, the sport is imaged at a shutter speed as highest as possible, thereby enabling a figure that is fast in motion to be imaged in a stationary state. However, from a viewpoint of difficulty in setting, a numerous number of the conditions cannot be set to the imaging condition, and only a general-use setting value is prepared for a typical imaging condition, whereby the effect for the actual imaging condition that is multifarious is not so high.

On the other hand, a desire of taking a picture as beautifully as possible is still strong, so there exists the technology of aiming for providing for a user a recommended composition of the imaging object, which is a technology for responding to its desire (for example, Patent document 1).

Figure 10:
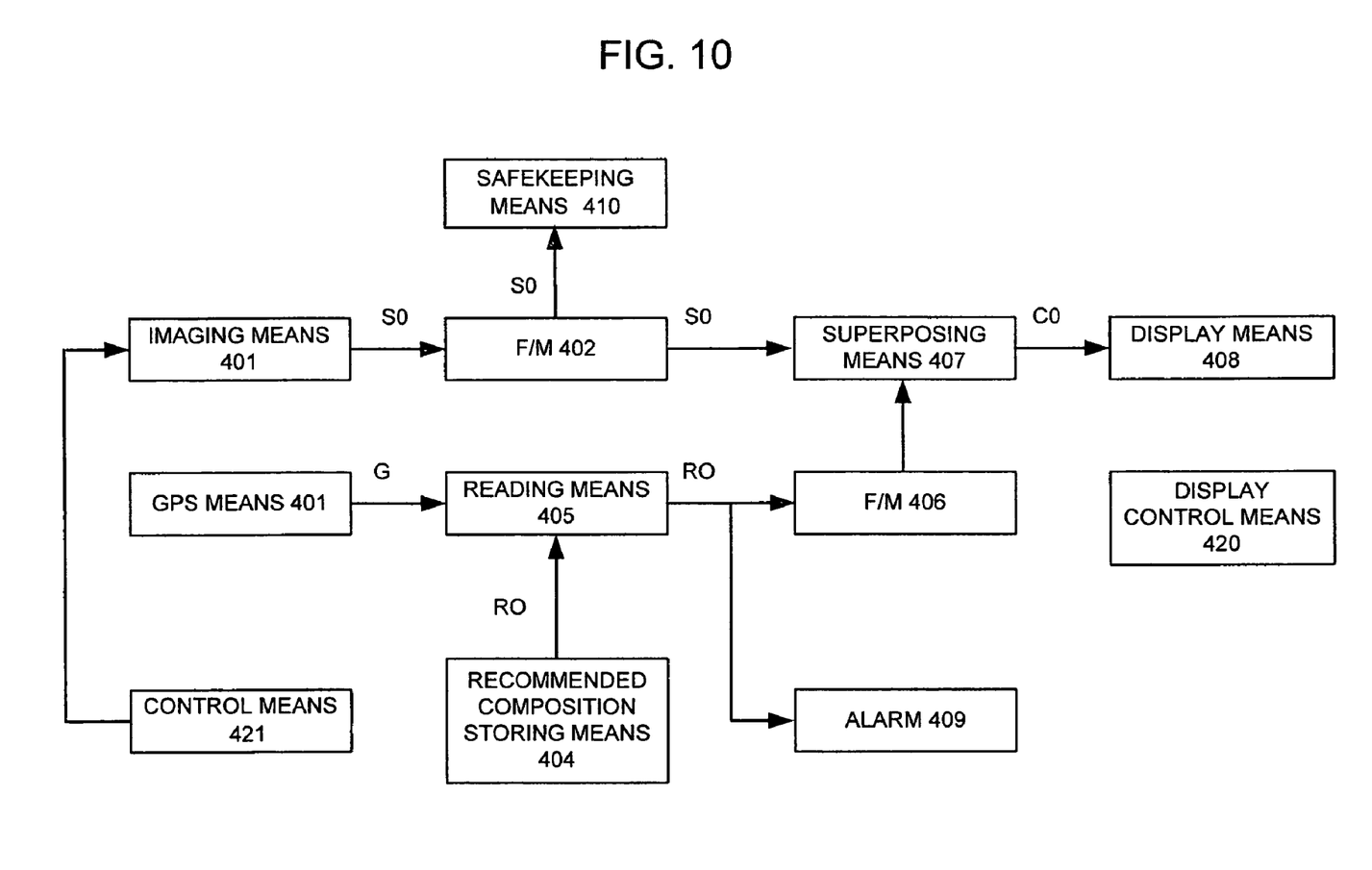
FIG. 10 is a view for explaining a prior art.

In the technology disclosed in the Patent document 1, as shown in FIG. 10, a plurality of recommended composition data R each representative of the image in a recommended composition at an imaging position are pre-stored in recommended composition storing means 400 correspondingly to positional information representative of the imaging position. GPS means 403 receives a positioning radio wave from GPS satellites and inputs GPS information G into reading means 405. The reading means 405 searches the recommended composition storing means 404 based upon the positional information of the GPS information and reads out recommended composition data R0, if any, and then inputs it into superposing means 407. Image data S0 picked up by imaging means 401 is also input into the superposing means 407, in which a superposing image C0 of the image data S0 and the recommended composition data R0 is generated and displayed on display means 408. A photographer takes a photo by causing the recommended composition data R0 and the image S0 to match each other, thereby allowing the image in a recommended composition to be obtained because the image data S0 is displayed on the display means 408 in real time.

[Patent document 1]
JP-P2002-10114A

DISCLOSURE OF THE INVENTION

Problems to be Solved by the Invention

The foregoing prior art, however, is an art having attention paid to the composition as one imaging condition for taking a beautiful picture, in which even though the photo image is obtained in a recommended composition, a beautiful picture cannot be taken unless the other imaging conditions conform to its photo image. The foregoing prior art as well makes mention of providing the recommended imaging condition; however no mention is made of the imaging condition concerning the very current date and weather in which the imaging object is to be photoed, but only the date and weather suitable for photoing the imaging object is described. As a matter of fact, most photographers cannot frequent the imaging place for the purpose of taking a picture, whereby there is a necessity for providing the imaging condition optimal for its date and weather to the photographer; however how to provide the imaging condition is not described.

On the other hand, recently, the chance has been increased of taking a picture with a digital camera instead of a silver salt film camera. However, in order to take a beautiful picture with this digital camera, the imaging conditions that are dispensable in the silver salt film camera, for example, a white balance and so on have to be taken into consideration, and these imaging conditions are difficult for a beginner to set.

Thereupon, the present invention has been accomplished in consideration of the above-mentioned problems, and an object thereof is to provide an imaging technology that is capable of obtaining an optimal photo image under the imaging situations such as a position thereof and a date by analyzing imaging information to get an imaging object and an imaging situation, and to set an appropriate imaging condition that corresponds hereto for the imaging means.

Means to Solve the Problem

The first invention for solving the above-mentioned problem, which is an imaging system comprising: storage means having imaging condition information for setting imaging condition stored; imaging information obtainment means for obtaining imaging information; imaging means for, by imaging an imaging object, obtaining image data of the imaging object; imaging information analysis means for analyzing the imaging information obtained in the imaging information obtainment means, thereby to obtain imaging condition information of the image data from the storage means; and imaging condition setting means for, based upon the imaging condition information obtained in the imaging information analysis means, setting the imaging condition to the imaging means.

The second invention for solving the above-mentioned problem, which is an imaging system comprising: storage means having imaging condition information for setting imaging condition stored; imaging information obtainment means for obtaining imaging information; imaging means for, by imaging an imaging object, obtaining image data of the imaging object; imaging information analysis means for analyzing the imaging information obtained in the imaging information obtainment means to get an imaging object or an imaging situation, and for obtaining imaging condition information that corresponds to this imaging object or imaging situation from the storage means; and imaging condition setting means for, based upon the imaging condition information obtained in the imaging information analysis means, setting the imaging condition to the imaging means.

The third invention for solving the above-mentioned problem, which is an imaging system comprising: storage means having imaging condition information, setting condition information for imaging a photo image, and an imaging object or an imaging situation, for which this imaging condition information is applied, stored correspondingly; imaging information obtainment means for obtaining imaging information; imaging means for, by imaging an imaging object, obtaining image data of the imaging object; imaging information analysis means for analyzing the imaging information obtained in the imaging information obtainment means to get an imaging object or an imaging situation, and for obtaining imaging condition information that corresponds to this imaging object or imaging situation from the storage means; and imaging condition setting means for, based upon the imaging condition information obtained in the imaging information analysis means, setting the imaging condition to the imaging means.

The fourth invention for solving the above-mentioned problem, which is an imaging system comprising: an imaging condition information database having imaging condition information, setting condition information for imaging a photo image, and an imaging object or an imaging situation, for which this imaging condition information is applied, stored correspondingly; an imaging information database having imaging information and an imaging object or an imaging situation stored correspondingly; imaging information obtainment means for obtaining imaging information; imaging means for, by imaging an imaging object, obtaining image data of the imaging object; imaging information analysis means for retrieving an imaging object or an imaging situation that corresponds to the imaging information obtained in the imaging information obtainment means from the imaging information database, and for obtaining imaging condition information that corresponds to this imaging object or imaging situation from the imaging condition information database; and imaging condition setting means for, based upon the imaging condition information obtained in the imaging information analysis means, setting the imaging condition to the imaging means.

The fifth invention for solving the above-mentioned problem is characterized in that in one of the above-mentioned first invention to fourth invention, the imaging information obtainment means is means for obtaining information of an imaging position.

The sixth invention for solving the above-mentioned problem is characterized in that in one of the above-mentioned first invention to fifth invention, the imaging information obtainment means is means for obtaining information of an imaging date.

The seventh invention for solving the above-mentioned problem is characterized in that in one of the above-mentioned first invention to sixth invention, the imaging information obtainment means is means for obtaining information of weather at the time of imaging.

The eighth invention for solving the above-mentioned problem is characterized in that in one of the above-mentioned first invention to seventh invention, the imaging information obtainment means is means for obtaining information of an imaging angle.

The ninth invention for solving the above-mentioned problem is characterized in that in one of the above-mentioned first invention to eighth invention: the imaging system comprising: storage means having image correction information for correcting image data stored; imaging information analysis means for analyzing the imaging information obtained in the imaging information obtainment means, thereby to obtain image correction information of the image data from the storage means; and image processing means for, based upon the image correction information obtained in the imaging information analysis means, correction-processing the image data obtained in the imaging means.

The eleventh invention for solving the above-mentioned problem, which is an imaging setting method is characterized in obtaining imaging information at the time of imaging, analyzing this imaging information, thereby to get an imaging object or an imaging situation, retrieving imaging condition information that corresponds to this imaging object or imaging situation from the accumulated imaging condition information, and setting the imaging condition of imaging a photo image.

The twelfth invention for solving the above-mentioned problem, which is an imaging setting method is characterized in obtaining imaging information at the time of imaging, analyzing this imaging information, thereby to get an imaging object or an imaging situation, retrieving imaging condition information that corresponds to this imaging object or imaging situation from the imaging condition information accumulated responding to the imaging object or the imaging situation, and setting the imaging condition of imaging a photo image.

The thirteenth invention for solving the above-mentioned problem, which is an imaging setting method is characterized in pre-accumulating information of a location and an imaging condition, searching the accumulated information based upon the imaging position, thereby to extract information of an imaging condition that corresponds hereto, and employing the information of the imaging condition, thereby to set the imaging condition.

The fourteenth invention for solving the above-mentioned problem, which is an imaging setting method is characterized in pre-accumulating information of a location, a date, and an imaging condition, searching the accumulated information based upon the imaging position and the imaging date, thereby to extract information of an imaging condition that corresponds hereto, and employing the information of the imaging condition, thereby to set the imaging condition.

The fifteenth invention for solving the above-mentioned problem, which is an imaging setting method is characterized in pre-accumulating information of a location, a date, weather and an imaging condition, searching the accumulated information based upon the imaging position, the imaging date and the weather at the time of imaging, thereby to extract information of an imaging condition that corresponds hereto, and employing the information of the imaging condition, thereby to set the imaging condition.

The sixteenth invention for solving the above-mentioned problem, which is an imaging setting method is characterized in pre-accumulating information of a location, a date, weather, an angle, and an imaging condition, searching the accumulated information based upon the imaging position, the imaging date, the weather at the time of imaging, and the imaging angle, thereby to extract information of an imaging condition that corresponds hereto, and employing the information of the imaging condition, thereby to set the imaging condition.

The seventeenth invention for solving the above-mentioned problem is characterized in that, in one of the above-mentioned eleventh invention to sixteenth invention: in analyzing the imaging information, thereby to get an imaging object or an imaging situation, retrieving image correction information that corresponds to this imaging object or imaging situation from the accumulated image correction information, and correction-processing the photo image based upon this image correction information.

The eighteenth invention for solving the above-mentioned problem, which is an imaging system comprising: a mobile terminal including: imaging means for, by imaging an imaging object, obtaining image data of the imaging object; imaging information obtainment means for obtaining imaging information; imaging condition setting means for, based upon transmitted imaging condition information, setting the imaging condition of the imaging means; and means for transmitting the imaging information obtained in the imaging information obtainment means; and a server including: storage means having imaging condition information of the imaging means stored; imaging information analysis means for receiving imaging information from the mobile terminal, analyzing the received imaging information, thereby to get an imaging object or an imaging situation, and obtaining imaging condition information that corresponds to this imaging object or imaging situation from the storage means; and transmission means for transmitting the imaging condition information obtained in the imaging information analysis means to the mobile terminal.

The nineteenth invention for solving the above-mentioned problem, which is a mobile terminal comprising: imaging means for, by imaging an imaging object, obtaining image data of the imaging object; imaging information obtainment means for obtaining imaging information; means for transmitting the imaging information to a server; means for receiving imaging condition information that corresponds to the imaging information; and imaging condition setting means for, based upon obtained imaging condition information, setting the imaging condition of the imaging means.

The twentieth invention for solving the above-mentioned problem, which is a server for transmitting imaging condition information for imaging to a terminal comprising: storage means having the imaging condition information for imaging stored; imaging information analysis means for receiving imaging information that is transmitted from the terminal, analyzing the received imaging information, thereby to get an imaging object or an imaging situation, and obtaining imaging condition information that corresponds to this imaging object or imaging situation from the storage means; and transmission means for transmitting the imaging condition information obtained in the imaging information analysis means to the terminal.

The twenty-first invention for solving the above-mentioned problem, which is a program of a terminal is characterized in causing the terminal to function as: imaging information obtainment means for obtaining imaging information; means for transmitting the imaging information to a server; means for receiving imaging condition information that corresponds to the imaging information; and imaging condition setting means for, based upon obtained imaging condition information, setting the imaging condition of the imaging means of which obtaining image data of an imaging object.

The twenty-second invention for solving the above-mentioned problem, which is a program of an information processing unit for transmitting imaging condition information for imaging to a terminal, is characterized in causing the information processing unit to function as: imaging information analysis means for receiving imaging information that is transmitted from the terminal, analyzing the received imaging information, thereby to get an imaging object or an imaging situation, and obtaining imaging condition information that corresponds to this imaging object or imaging situation from storage means that is stored imaging condition information for imaging; and transmission means for transmitting the imaging condition information obtained in the imaging information analysis means to the terminal.

Figure 1:
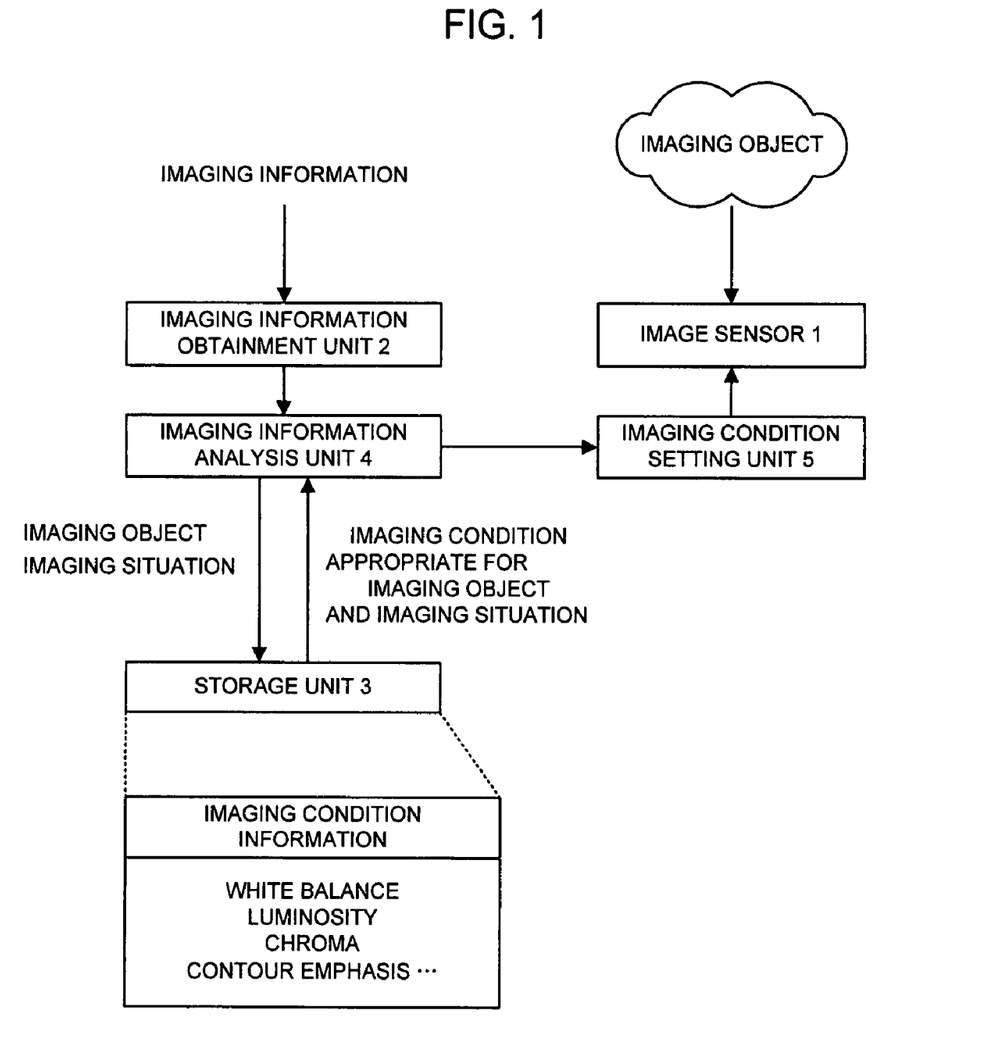
FIG. 1 is a view for explaining an outline of the present invention.

In this present invention, at first, as shown in FIG. 1, an image sensor 1 such as a camera images the imaging object and obtains image data. On the other hand, an imaging information obtainment unit 2 obtains imaging information that is information at the time of imaging. Herein, the imaging information that is obtained in the imaging information obtainment unit 2 is, for example, an imaging location, an imaging date, weather at the time of imaging, an imaging angle or direction, a view angle of an imaging lens, etc.

Further, a storage unit 3 has suitable imaging condition information based on the imaging information. Additionally, the imaging condition information includes, for example, not only color corrections such as a white balance, luminosity, and chroma for imaging, but also contouring emphasis.

An imaging information analysis unit 4 analyzes the imaging information given from the imaging information obtainment unit 2 and reads out imaging condition information appropriate for imaging from the storage unit 3. And, an imaging condition setting unit 5 set the imaging condition of image sensor 1 based on the imaging condition information obtained by the imaging information analysis unit 4

Effects of the Invention

In accordance with the present invention, imaging information such as location information and date information is obtained, this imaging information is analyzed, and the appropriate imaging condition information that is obtained based upon the analysis result is obtained. Image object is imaged by the appropriate imaging condition without causing a photographer to performing a special operation, thereby enabling a person as well, who has no knowledge about the image process, to easily get the photo image that is wonderful.

Further, the present invention, which is configured to analyze the imaging information such as the location information and the date information, thereby to get the imaging object or the imaging situation, and to obtain the imaging condition information from this imaging object or imaging situation, makes it possible to obtain the appropriate imaging condition in case of the multifarious imaging objects, or the complicated imaging situations, without recognizing a specific imaging object or imaging situation as is the case of the prior art.

DESCRIPTION OF NUMERALS 1 image sensor
2 imaging information obtainment unit
3 storage unit
4 imaging information analysis unit
5 imaging condition setting unit

BEST MODE FOR CARRYING OUT THE INVENTION

Figure 2:
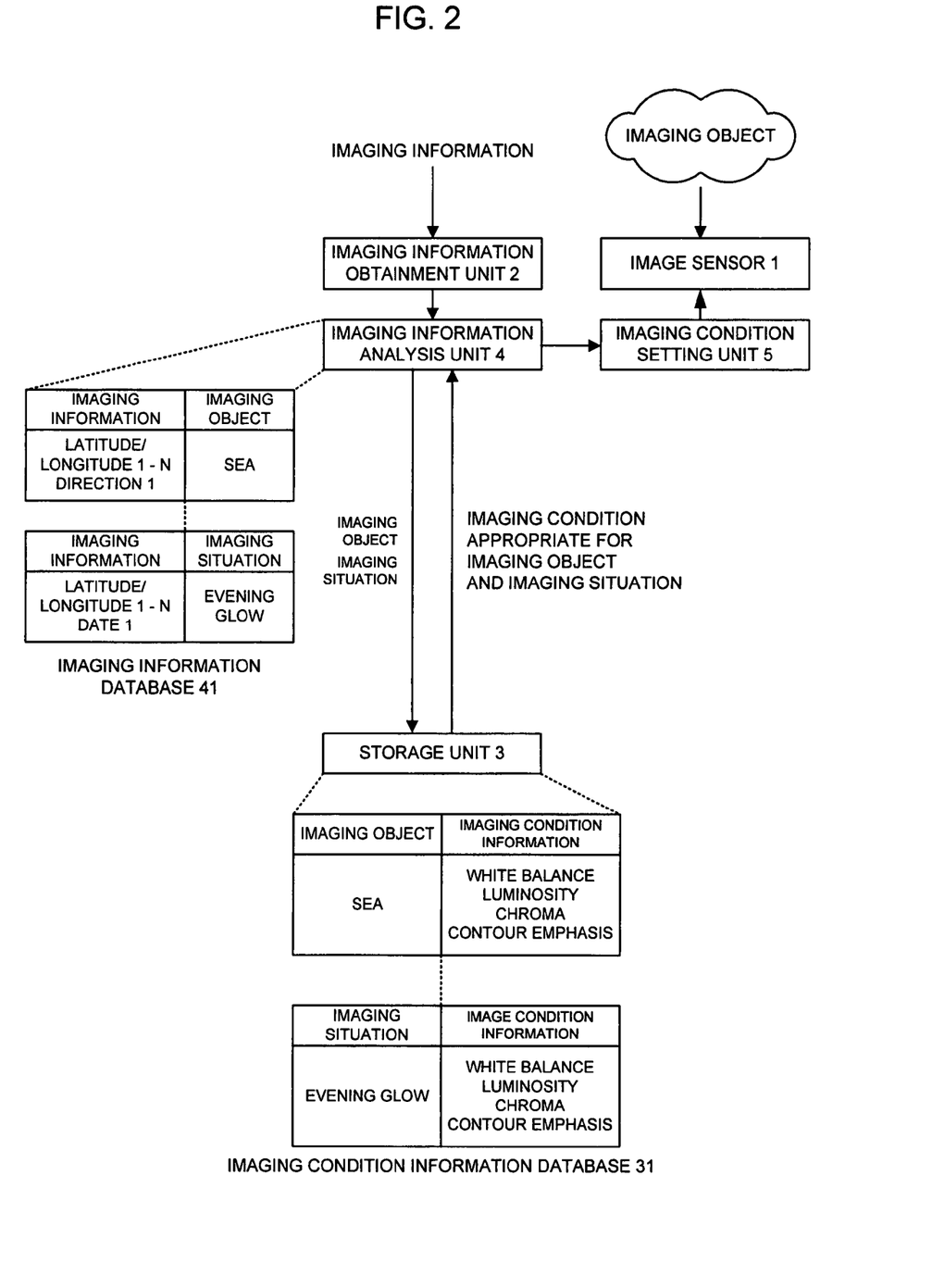
FIG. 2 is a view for explaining an outline of an embodiment of the present invention.

At first, an outline of the best mode for carrying out the present invention will be explained in details by making a reference to FIG. 2. Additionally, an identical numeral is affixed to a component similar to that of the foregoing FIG. 1.

In the present invention, an image sensor 1 such as a camera images the imaging object, and obtains image data. On the other hand, an imaging information obtainment unit 2 obtains imaging information that is information at the time of imaging. Herein, the imaging information that is obtained in the imaging information obtainment unit 2 is, for example, an imaging location, an imaging date, weather at the time of imaging, an imaging angle or direction, etc.

An imaging information analysis unit 4 includes an imaging information database 41 having an imaging object or an imaging situation stored that corresponds to the imaging information so as to analyze the imaging information given from the imaging information obtainment unit 2. For example, the imaging information database 41 has information such as latitude/longitude and a direction, and information of the imaging object stored correspondingly. Further, it has information such as latitude/longitude, a direction, and a date, and information of the imaging conditions such as morning, a night scene, front light, and backlight stored correspondingly.

Owing to such an imaging information database 41, the imaging information analysis unit 4 retrieves information that corresponds to the imaging information (for example, information such as latitude/longitude, a direction and a date) given from the imaging information obtainment unit 2 from the imaging information database 41, and gets the imaging object and the imaging situation caused to correspond to this information. The imaging object or the imaging situation can be pin-pointedly determined in such a manner that, for example, the imaging object can be determined to be sea from information such as latitude/longitude and a direction, or the imaging situation is determined to be evening glow from information such as latitude/longitude, a direction and a date.

Additionally, it is not always necessary that the imaging information database 41 has plural kinds of imaging information and the imaging situation or the imaging object caused to correspond to each other at one versus one, and it may store one kind of information and auxiliary information for obtaining the imaging situation or the imaging object correspondingly. And, a configuration may be made so that the imaging information analysis unit 4 gets the imaging situation or the imaging object based upon plural kinds of auxiliary information obtained from the imaging information. For example, a configuration may be made so that in a case where the imaging information analysis unit 4 searches the imaging information database 41, obtains the auxiliary information such as a high mountain from the positional information, and obtains the auxiliary information such as winter from the date information, it determines from a combination of a high mountain and winter that the imaging object is a snowy mountain.

A storage unit 3 includes an imaging condition information database 31 having imaging condition information for setting an appropriate imaging condition, and an imaging object or an imaging situation, to which this imaging condition information is applied, stored correspondingly. Additionally, the imaging condition information includes, for example, not only color corrections such as a white balance, luminosity, and chroma of the image, but also such as contour emphasis. Furthermore, the imaging condition information includes an angle of view of a lens, a diaphragm and a shutter speed of image sensor 1.

And, as described above, the imaging information analysis unit 4 analyzes the imaging information given from the imaging information obtainment unit 2, gets an imaging object or an imaging situation, and reads out the imaging condition information that corresponds to this imaging object or imaging situation from the storage unit 3. An imaging condition setting unit 5 set imaging conditions to image sensor 1 based upon the imaging condition information obtained by the imaging information analysis unit 4. Image sensor 1 images an imaging object based on the set imaging conditions and obtains the image.

Additionally, the imaging information database 41 of the imaging information analysis unit 4 and the imaging condition information database 31 may be collected into one database to contain this database into the storage unit 3. In this case, the imaging information analysis unit 4 makes a reference to the database of the storage unit 3, thereby to read out the imaging condition information.

Next, a first embodiment of the present invention based upon the foregoing outline will be explained in details by making a reference to FIG. 3. Additionally, an identical numeral is affixed to a component similar to that of the foregoing FIG. 1 and FIG. 2.

Figure 3:
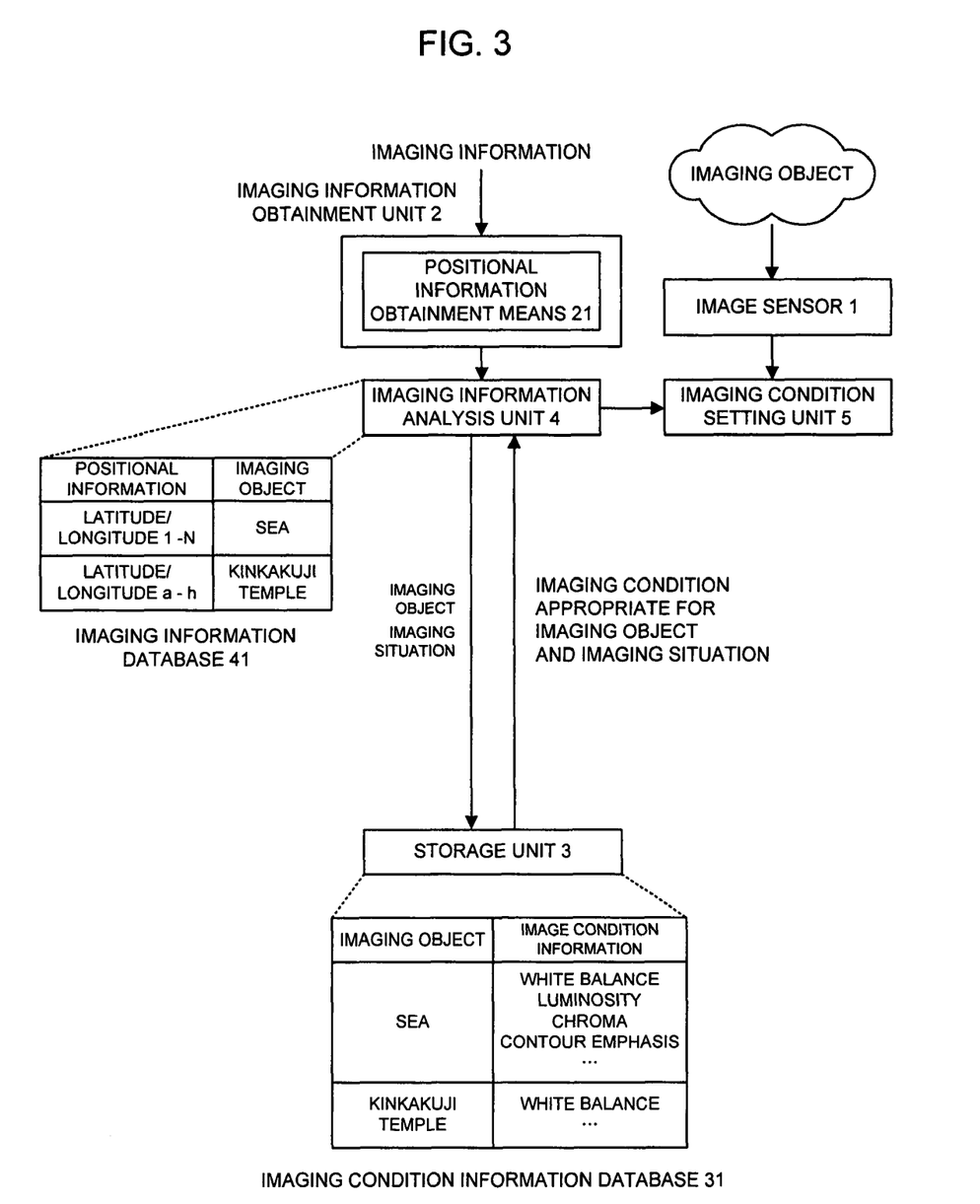
FIG. 3 is a view for explaining an outline of a first embodiment of the present invention.

The present invention, as shown in FIG. 3, includes an image sensor 1 such as a camera, an imaging information obtainment unit 2 for obtaining imaging information that is information at the time of imaging, a storage unit 3 having imaging condition information for correcting a photo image and an imaging object stored correspondingly, an imaging information analysis unit 4 for analyzing the imaging information given from the imaging information obtainment unit 2 to get the imaging object, and for obtaining the imaging condition information that corresponds to this imaging object from the storage unit 3, and an imaging condition setting unit 5 for, based upon the imaging condition information obtained in the imaging information analysis unit 4, setting the imaging condition to the image sensor 1.

The image sensor 1 is an imaging apparatus having various functions necessary for the imaging, for example, a single-lens reflex camera, a digital camera, a digital video camera, a mobile telephone with a camera, and a USB camera.

The imaging information obtainment unit 2 is equipped with positional information obtainment means 21, and positional information obtainment means 21, which is for obtaining an imaging position of the image, obtains information associated with the imaging position and the imaging direction as GPS information, for example, by utilizing an electromagnetic wave for positioning from a GPS satellite. Herein, the so-called imaging position is a position in which the imaging apparatus exists, and is expressed by latitude and longitude. On the other hand, the so-called imaging direction is a direction in which the imaging apparatus faces the imaging object. Additionally, an electronic direction magnet etc. may be mounted to obtain the imaging direction so that a direction to which a lens of the image sensor 1 points can be recognized.

The storage unit 3 is a medium having an imaging condition information database 31 having imaging condition information for setting an appropriate imaging condition and an imaging object to which this imaging condition information is applied stored correspondingly. The imaging condition information, which is for expressing a imaging parameter optimal for the imaging in some tourist attraction, has been stored correspondingly to the imaging object (herein, a building name) in the storage unit 3. For example, in a case where the imaging object (herein, a building name) is Kinkakuji temple, the storage unit 3 has stored the imaging condition information that allows a building of Kinkakuji temple to be clearly viewed as the imaging condition information.

The imaging information analysis unit 4 is for analyzing the imaging object based upon the positional information, and for reading out the imaging condition information that corresponds to this imaging object from the storage unit 3. Specifically, as shown in FIG. 3, the imaging information analysis unit 4, for each certain positional information, pre-stores the building name (imaging object) that exists there into the imaging information database 41, and gets the building name (imaging object) that corresponds to the positional information obtained in the positional information obtainment means 21 from the imaging information database 41. And, it reads out the imaging condition information that corresponds to this building name (imaging object) from the imaging condition information database 31 of the storage unit 3.

For example, if the positional information is latitude/longitude a, the imaging information analysis unit 4 analyzes the imaging object, thereby to determine that it is Kinkakuji temple, and reads out the imaging condition information that corresponds to Kinkakaji temple (imaging object) from the imaging condition information database 31 of the storage unit 3.

Image condition setting unit 5, based upon imaging condition information obtained in the imaging information analysis unit 4, sets the imaging condition to the image sensor 1.

The effect in this embodiment is that obtaining the positional information makes it possible to automatically analyze which imaging body (imaging object) exists in its position, and photo the imaging body (imaging object) with the suitable imaging condition without causing a photographer to perform a special operation.

Additionally, in the foregoing example, a configuration was made so that the imaging condition information database 31 of the storage unit 3 was caused to correspondingly store the building name (imaging object) and the imaging condition information, and the imaging information analysis unit 4 read out the imaging condition information that corresponded to the building name (imaging object) obtained by analyzing the imaging information.

However, the configuration is not limited hereto, and a configuration may be made so that the imaging condition information database 31 is caused to correspondingly pre-store the imaging condition such as a white balance and sharpness, and a plurality of correction values or levels that are employed for parameters of these condition, and after the imaging information analysis unit 4 analyzes the imaging object, it reads out the imaging condition information such as a white balance and a level of sharpness suitable for its imaging object from the imaging condition information database 31. For example, a configuration is made so that if the positional information is latitude/longitude 1, the imaging information analysis unit 4 analyzes the imaging object, thereby to determine that it is Kinkakuji temple, and reads out the sharpness, or the parameter information, which allows a color of gold, being a material of the exterior of Kinkakuji temple, to becomes optimal as the imaging condition information necessary for optimally imaging Kinkakuju temple from imaging condition information database 31 of the storage unit 3.

And, the imaging condition setting unit 5, for example, with Kinkakuju temple, set a level of sharpness given from the imaging information analysis unit 4, and set a color parameter that converts the color of the exterior of Kinkakuji temple in the image into a satisfactory golden color.

Next, a second embodiment of the present invention will be explained.

Figure 4:
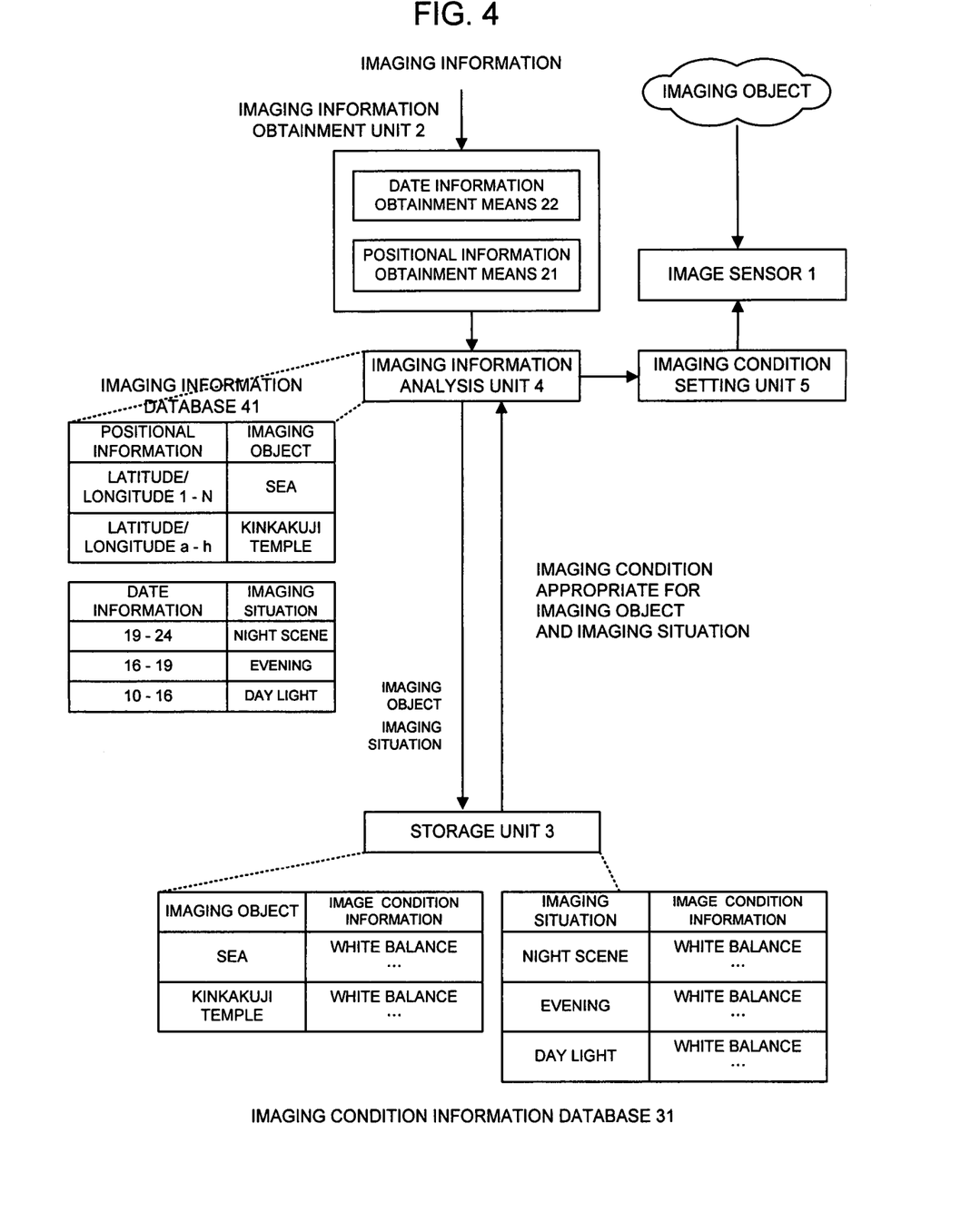
FIG. 4 is a view for explaining an outline of a second embodiment of the present invention.

FIG. 4 is a schematic block diagram illustrating a configuration of the system in accordance with the second embodiment of the present invention. Additionally, an identical numeral is affixed to a component similar to that of the first embodiment in the second embodiment, so the detailed explanation is omitted.

In the second embodiment, the imaging information obtainment unit 2 is equipped with date information obtainment means 22 in addition to the positional information obtainment means 21. The date information obtainment means 22, which is for obtaining the date at the time of having photoed the image, obtains, for example, the imaging date information from a built-in timer in the imaging apparatus. Further, the imaging apparatus having no function of building-in a timer, for example, a USB camera obtains the imaging date information from a computer etc. being a connection destination of the imaging apparatus. Or, the GPS information of the positional information obtainment means 21 may be used in substitute for the timer, thereby to obtain the imaging date information.

The storage unit 3 has the imaging condition added besides the imaging object, and based upon the positional information and data, has the imaging condition information suitable for correcting the image photoed in its position and date stored correspondingly hereto. For example, the imaging condition information database 31 of FIG. 4 has specific imaging object names or building names stored as the imaging object, and a night scene, evening, day light, etc. stored as the imaging situation. And, in a case where the imaging object is Kinkakuji temple, with imaging condition information thereof, the imaging condition information database 31 has such imaging condition information that allows the building of Kinkakuji temple to be clearly viewed stored, and in a case where the imaging situation is a night scene, it has the imaging condition information such as a white balance for a night scene stored.

The imaging information analysis unit 4 is for analyzing an imaging object or an imaging condition based upon the positional information and the date information, and for reading out the imaging condition information that corresponds to this imaging object and imaging condition from the storage unit 3. Specifically, as shown in FIG. 4, the imaging information analysis unit 4, for each certain positional information, pre-stores names of buildings (imaging objects) that exist there, and gets the imaging object that corresponds to the positional information obtained in the positional information obtainment means 21. Further, the imaging information analysis unit 4, for each certain date information, pre-stores conditions that are suitable for it, and gets the imaging condition that corresponds to the date information obtained in the date information obtainment means 22. And, it reads out the imaging condition information that corresponds to the imaging object or the imaging condition from the storage unit 3.

For example, if the positional information is latitude/longitude a, the imaging information analysis unit 4 analyzes the imaging object, thereby to determine that it is Kinkakuji temple, if the date information is "19 o'clock on September 25", it analyzes the imaging condition, thereby to determine that it is the night scene, and it reads out the imaging condition information saying that the imaging object is Kinkakuji temple, and the imaging situation is the night scene from the storage unit 3. And, based upon the imaging condition information of Kinkakuji temple and the imaging condition information of the night scene, imaging condition setting unit 5 sets an imaging condition of an edge emphasis that Kinkakuji temple is clearly viewed, and a white balance for a night scene stored, to the image sensor 1.

At this time, when the imaging information analysis unit 4 is given several imaging conditions and these imaging correction amounts, it may merge respective correction effects to calculate more optimal imaging condition, and to assume its calculation result to be a imaging condition.

In a case where, for example, plural kinds of imaging condition information, i.e. the imaging condition information of Kinkakuji temple and the imaging condition information of the night scene are obtained, when the correction amount that is defined for the gamma correction and the sharpness, respectively, is applied as it stands, some area is corrected more than envisaged previously, whereby on the contrary, the image in which noise comes to the fore results in being produced in some cases. Thereupon, the imaging information analysis unit 4 calculates the final imaging condition having the effect of the image, which is finally to be obtained, taken into consideration from the correction amounts that are defined respectively.

The effect in this embodiment is that obtaining the positional information and the date information makes it possible to automatically analyze which imaging body exists based upon its positional information, to analyze the imaging situation of its imaging body based upon its date information, and to obtain an optimal imaging condition for imaging object without causing a photographer to perform a special operation.

Next, a third embodiment of the present invention will be explained.

Figure 5:
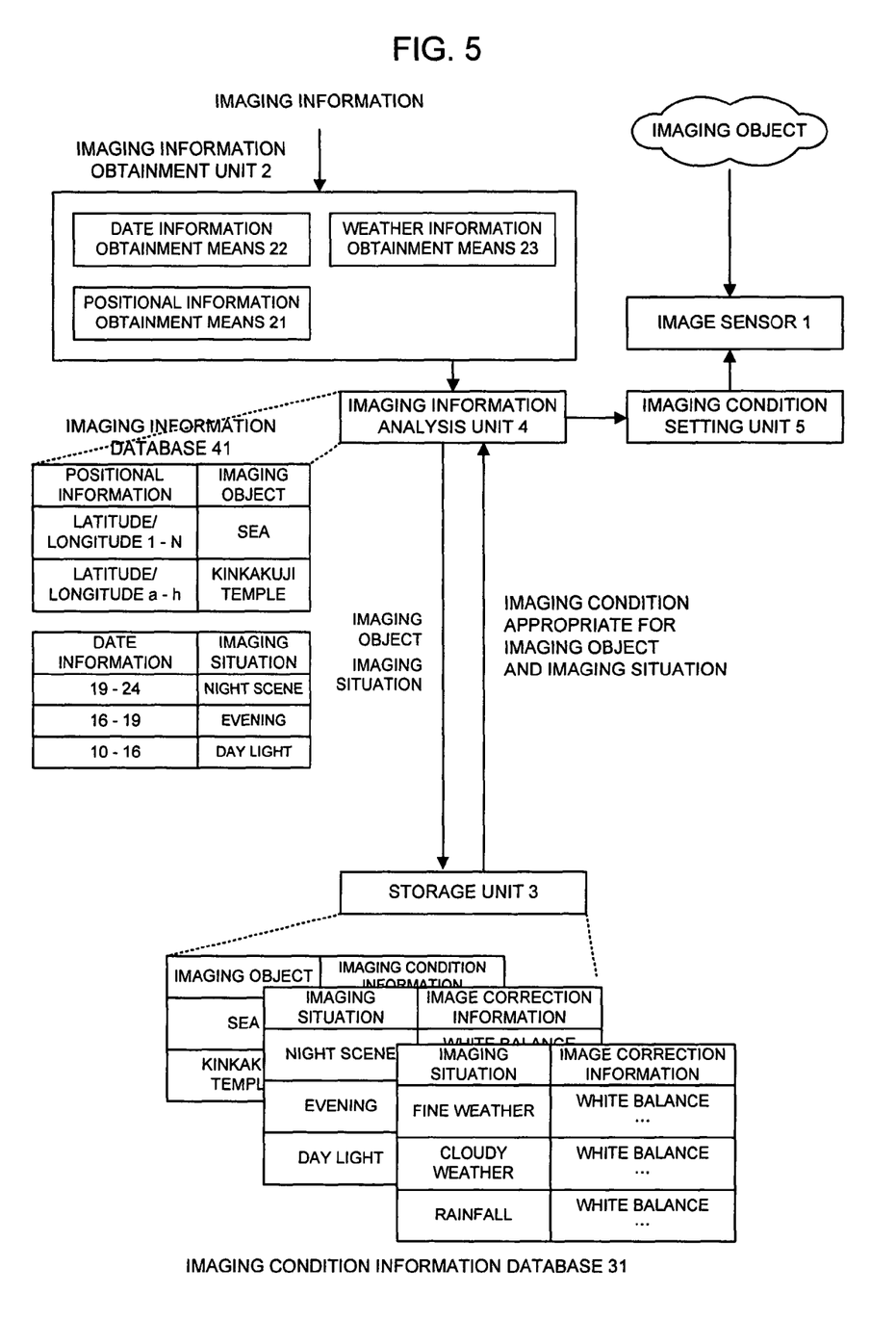
FIG. 5 is a view for explaining an outline of a third embodiment of the present invention.

FIG. 5 is a schematic block diagram illustrating a configuration of the system in accordance with the third embodiment of the present invention. Additionally, an identical numeral is affixed to a component similar to that of the first and the second embodiments in the third embodiment, so the detailed explanation is omitted.

In the third embodiment, weather information obtainment means 23 installed to the imaging information obtainment unit 2 obtains weather information at the time of the imaging. The weather information obtainment means 23 makes access to a weather information server etc. for providing weather information in the imaging position, thereby to obtain weather information in the imaging position based upon the GPS information.

The storage unit 3 has the imaging condition information stored that is suitable for correcting the image responding to, for example, the imaging condition saying that it is fine or cloudy at the time of imaging, in addition to the information in the foregoing first and second embodiments.

The imaging information analysis unit 4 is for analyzing an imaging information or an imaging situation based upon the positional information, the date information, and the weather information, and for reading out the imaging condition information that corresponds to this imaging information or imaging situation from the storage unit 3. Specifically, as shown in FIG. 5, the imaging information analysis unit 4, for each certain positional information, pre-stores the names of buildings that exist there, and gets the imaging object that corresponds to the positional information obtained in the positional information obtainment means 21. Further, the imaging information analysis unit 4, for each certain date information, pre-stores situation that are suitable for it, and obtains the imaging situation that corresponds to the date information obtained in the date information obtainment means 22. And, it reads out the imaging condition information that corresponds to these imaging object and imaging situation from the storage unit 3. Further, the imaging information analysis unit 4 reads out the imaging condition information, which corresponds to the imaging situation such as fine weather and cloudy weather information, i.e. the weather information obtained from the weather information server etc., from the storage unit 3 based upon the positional information etc.

In a case where, for example, the positional information of the imaging information is latitude/longitude a, the date information of the imaging information is "19 o'clock on October 25", and the weather information of the imaging information is cloudy weather, the imaging information analysis unit 4 determines that the imaging object is "Kinkakuji temple", and the imaging situation is "a night scene" and "cloudy weather", respectively, and reads out the imaging condition information that corresponds to respective imaging object and imaging situation from the storage unit 3. And, the imaging condition setting unit 5 sets a parameter of edge emphasis to the image sensor 1 based upon the obtained imaging condition information so that Kinkakuji temple is clearly viewed, sets a white balance etc for a night scene, and sets a parameter of chroma correction for an appropriate color.

Additionally, it is also acceptable that the storage unit 3 combines these correction-applied imaging conditions without having them individually, and stores the imaging condition information appropriate for this combination, and the imaging information analysis unit 4 reads out one item of the imaging condition information suitable for a combination of the correction-applied imaging conditions.

For example, it is also acceptable that assuming that Kinkakuji temple is illuminated by lighting at night for appreciating colored leaves in a fine day of the end of October, the storage unit 3 pre-stores the imaging condition information optimal for imaging the image of colored leaves and Kinkakuji temple illuminated by nocturnal lighting as the imaging condition information of the case of "Kinkakuji temple", "19 to 21 o'clock in the end of October" and "cloudy weather", and in a case where the positional information of the imaging information is latitude/longitude a, the date information of the imaging information is "19 o'clock on October 25", and the weather information of the imaging information is cloudy weather, the imaging information analysis unit 4 reads out its imaging condition information from the storage unit 3.

Doing so enables the imaging condition setting unit 5 to image the image having colored leaves and Kinkakuji temple illuminated by nocturnal lighting photoed, by use of the appropriate imaging condition information based upon this imaging condition information. As an example of the imaging condition, the satisfactory color setting is performed for only the colored leaves illuminated by nocturnal lighting so that they are tinged with red in a manner of colored leaves based upon the obtained imaging condition information, the edge emphasis having an effect of the lighting taken into consideration is performed for Kinkakuji temple.

Likewise, with the correction of a mountain or sea, at the time of having imaged a mountain or sea at a fine day of the middle of August, information such that the imaging position is determined to be a mountain or sea from the positional information, the imaging situation is determined to be summer and fine weather from the date information is analyzed, thereby making it possible to obtain the imaging condition information such as the satisfactory color information optimal for green of a summer mountain or a sky over summer sea caused to correspond to its condition.

The effect in this embodiment is that obtaining the positional information, the date information, and the weather information makes it possible to automatically analyze which imaging body exists based upon its positional information, to analyze the condition of its imaging body based upon its date information, to analyze the imaging situation of the imaging body based upon the weather information, and to obtain an optimal imaging condition for its imaging body without causing a photographer to perform a special operation.

Next, a fourth embodiment of the present invention will be explained.

Figure 6:
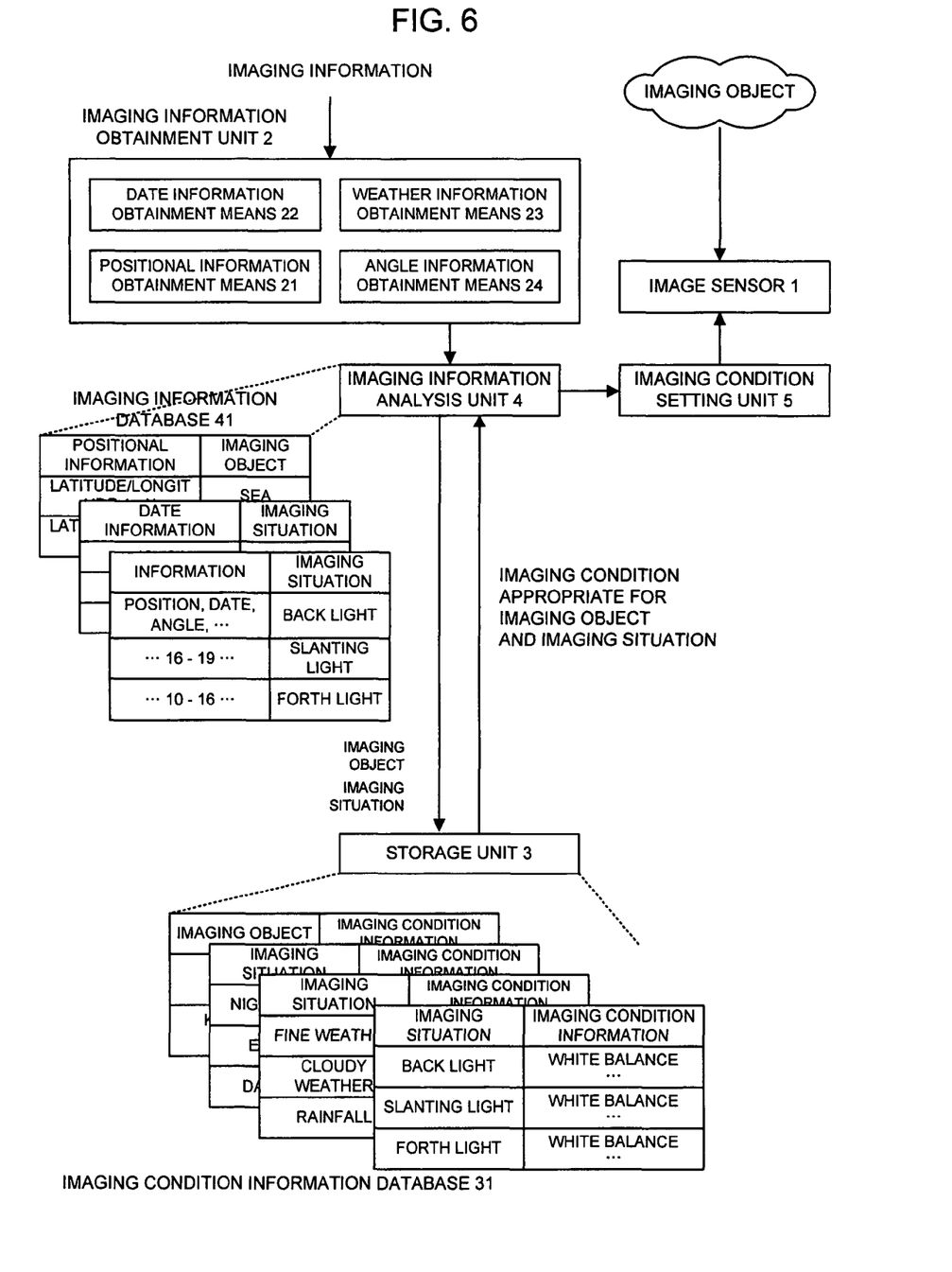
FIG. 6 is a view for explaining an outline of a fourth embodiment of the present invention.

FIG. 6 is a schematic block diagram illustrating a configuration of the system in accordance with the fourth embodiment of the present invention. Additionally, an identical numeral is affixed to a component similar to that of the first, the second, and third embodiments in the fourth embodiment, so the detailed explanation is omitted.

Angle information obtainment means 24 installed to the imaging information obtainment unit 2 obtains an angle of the imaging apparatus at the time of acquiring the image. The angle of the imaging apparatus is obtained by employing a gyro/gravity sensor etc.

The storage unit 3 has, for example, the imaging condition information tinged with an imaging angle, in addition to the information in the foregoing first, second, and third embodiments. For example, even in a case of imaging identical Kinkakuji temple, the content for imaging the image also varies depending upon forth light or back light. Thereupon, the imaging condition information for the imaging situation such as forth light, slanting light, and back light is also prepared in plural.

The imaging information analysis unit 4 is for analyzing the appropriate imaging object and imaging situation from the positional information that is included in the GPS information, the date information that is obtained based upon the built-in timer, the weather information that is obtained by making access to the weather information server, and the angle information that is obtained from the gravity sensor, and for reading out the image correction information that corresponds to this imaging object and imaging condition from the storage unit 3. Accordingly, the imaging information database 41, which is a database tinged with the angle information as well, is constructed so that a positional relation between the imaging location and the sun is derived from the positional information and the date information, and a positional relation between the lens of the imaging apparatus and the sun is derived from the positional information and the angle information.

Having such a database allows a positional relation between the imaging location and the sun to be analyzed from the positional information and the date information, and a positional relation between the lens of the imaging apparatus and the sun to be analyzed from the angle information according to the imaging information database 41, for example, at the time of having photoed the image about ten o'clock in a fine day of the middle of April, and in addition hereto, when fine weather is derived from the weather information, it is seen that the imaging condition is a backlight state.

This time, imaging condition setting unit 5 sets the imaging condition to image sensor 1 based on imaging condition information obtained by imaging information analysis unit 4.

The effect in this embodiment is that obtaining the positional information, the date information, the weather information, and the angle information makes it possible to automatically analyze which imaging body exists based upon the positional information at the time of imaging, to analyze the state of its imaging body based upon the date information, to analyze the photographic matching performance of the imaging body based upon the weather information, to analyze a direction of a lens of the imaging apparatus based upon the angle information, and to obtain an optimal imaging condition for the imaging body without causing a photographer to perform a special operation.

Additionally, the angle information may be employed as information for specifying the imaging object in addition to the positional information. For example, the imaging position can be specified from the positional information, and in addition hereto, the detailed imaging direction or imaging angle can be specified from the angle information, whereby causing the imaging information database 41 to correspondingly pre-store the positional information and angle information, and the imaging object, and in addition, causing the imaging condition information database 31 to correspondingly pre-store its imaging object and the imaging condition information of this imaging object make it possible to get the imaging condition information optimal for the imaging object. Specifically speaking, from positional information, it is understood that a imaging object is Kinkakuji Temple. It is impossible to know what a sort of the composition is aimed for the imaging in imaging Kinkakuji temple. Herein, employing the angle information makes it possible to specify the imaging object in details up to the point that the image is one obtained by imaging Kinkakuji temple having a pond arranged in the foreground, or the point that the image is one obtained by imaging Kinkakuji temple having sky arranged in the background. Accordingly, with the image of Kinkakuji temple having a pond arranged in the foreground, the imaging condition information can be obtained that enables a feeling of water of a pond to be produced, and in addition, Kinkakuji temple to be expressed beautifully, and with the image of Kinkakuji temple having sky arranged in the background, such imaging condition information that enables a blue color of sky to be expressed deeply and beautifully can be obtained, and this imaging condition information allows the appropriate imaging process to be performed.

Next, a fifth embodiment of the present invention will be explained.

Figure 7:
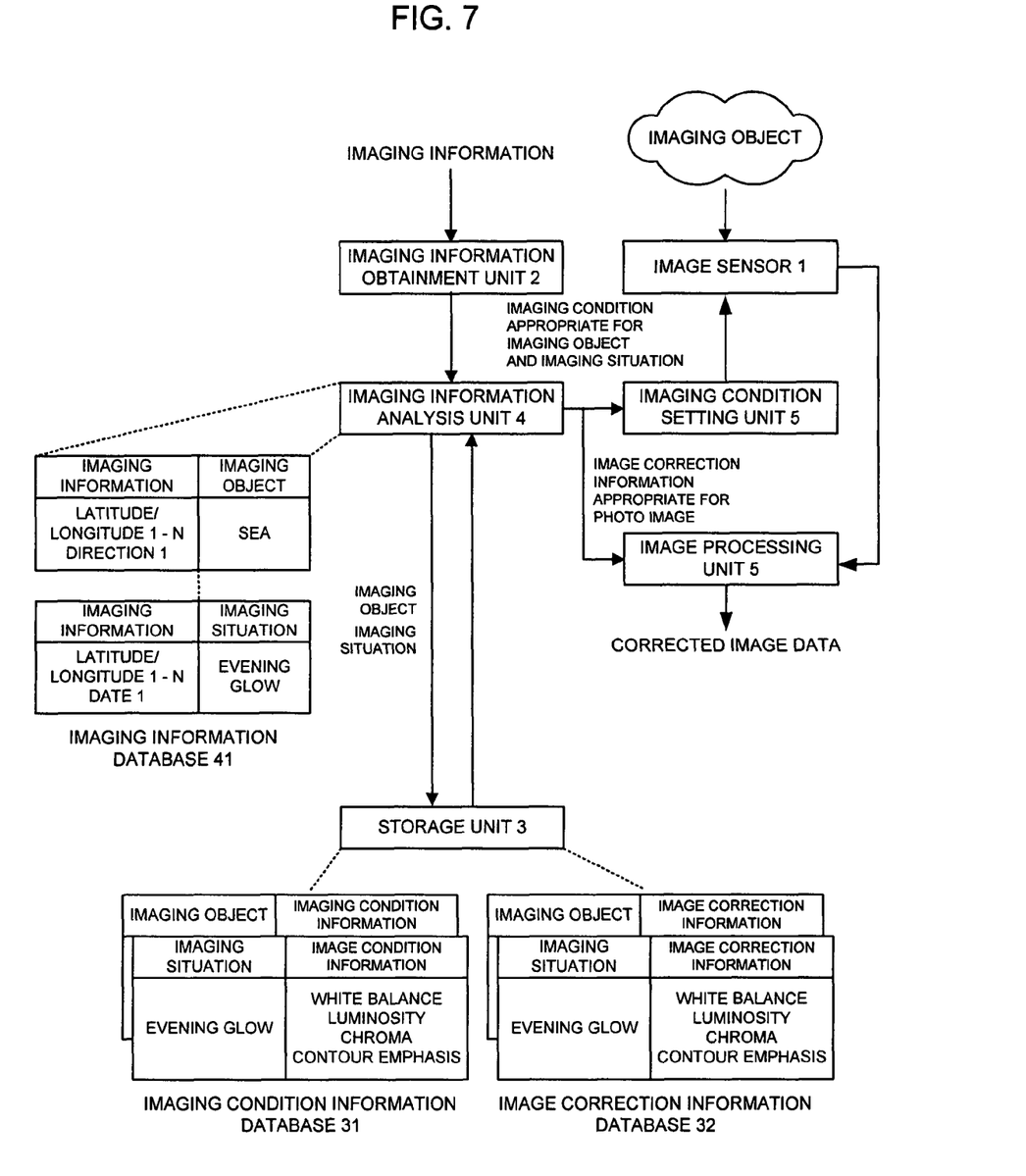
FIG. 7 is a view for explaining an outline of a fifth embodiment of the present invention.

FIG. 7 is a schematic block diagram illustrating a configuration of the system in accordance with the fifth embodiment of the present invention. Additionally, an identical numeral is affixed to a component similar to that of the first, the second, the third, and fourth embodiments in the fifth embodiment, so the detailed explanation is omitted.

The fifth embodiment is characterized in further including an image processing unit 6 for correction-processing the image data of the imaging object photoed in the image sensor 1. This image processing unit 6, which is for correction-processing the image data based upon the image correction information, puts the foregoing analysis result of the imaging information to practical use as the image correction information.

This image correction information has been stored in the storage unit 3, which includes an image correction information database 32 having image correction information for correcting a photo image, and an imaging object or an imaging situation, to which this image correction information is applied, stored correspondingly. Additionally, the image correction information includes, for example, not only color corrections such as a white balance, luminosity, and chroma of the image, but also processing of the image data such as contour emphasis.

And, as described above, the imaging information analysis unit 4 analyzes the imaging information given from the imaging information obtainment unit 2, gets an imaging object or an imaging situation, and reads outs the image correction information that corresponds to this imaging object or imaging situation from the storage unit 3. The image processing unit 6 subjects the image data of the imaging object obtained by the image sensor 1 to a correction process based upon the image correction information obtained by the imaging information analysis unit 4.

Additionally, the imaging information database 41 of the imaging information analysis unit 4 and the image correction information database 31 may be collected into one database to contain this database into the storage unit 3. In this case, the imaging information analysis unit 4 makes a reference to the database of the storage unit 3, thereby to read out the image correction information.

The effect in this embodiment is that even in a case where it is impossible to finish performing a supplement process only by setting the conditions at the time of photoing, for example, in a case where it is desirable to correct only one part of the photo image, a beautiful photo image is obtained by performing an appropriate correction process for the image after photoing.

Example 1

An example 1 of the present invention will be explained.

Figure 8:
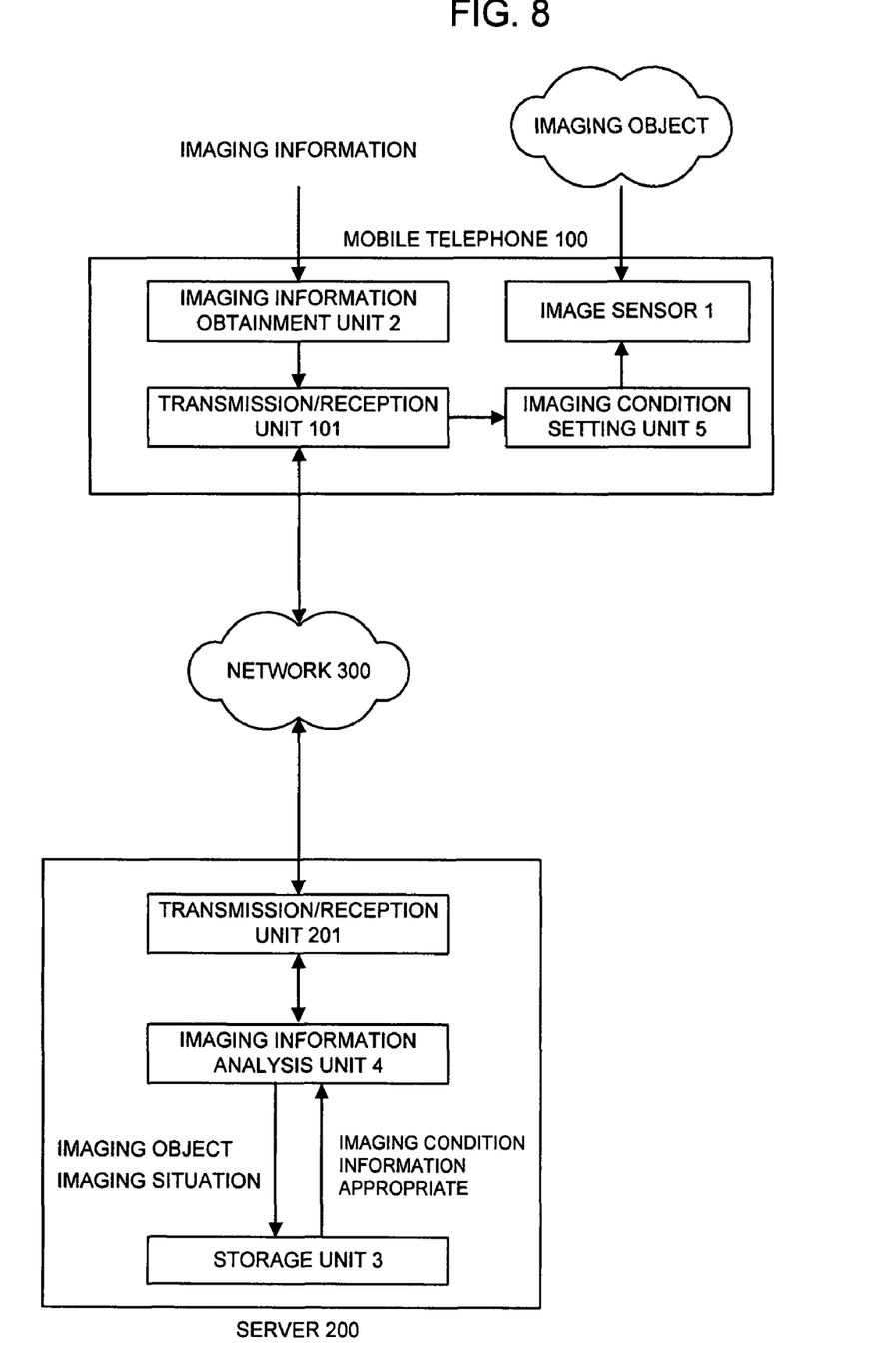
FIG. 8 is a view for explaining an outline of an example 1.

FIG. 8 is a view illustrating a configuration of the example 1 of the present invention.

As shown in FIG. 8, this system is configured of a mobile telephone 100, a server 200, and a network 300 for connecting the mobile telephone 100 and the server 200.

The mobile telephone 100 includes the foregoing image sensor 1, imaging information obtainment unit 2, and imaging condition setting unit 5, and further includes a transmission/reception unit 101 for transmitting/receiving the imaging information obtained in the imaging information obtainment unit 2 and the imaging condition information that is transmitted from the server 200.

The server 200 includes the foregoing storage unit 3 and the imaging information analysis unit 4, and further includes a transmission/reception unit 201 for transmitting the imaging information that is transmitted from the mobile telephone 100 and the imaging condition information that is transmitted to the mobile telephone 100.

In a system configured in such a manner, a user of the mobile telephone 100 photos an image with the image sensor 1 of the mobile telephone 100. Together with this, the imaging information obtainment unit 2 of the mobile telephone 100 obtains imaging information. And, the obtained imaging information is transmitted to the server 200 via the transmission/reception unit 101.

The server 200 receives the imaging information from the mobile telephone 100 via the transmission/reception unit 201, which is analyzed in the imaging information analysis unit 4 to get an imaging object and an imaging situation. And, the server 200 reads out imaging condition information that corresponds to the imaging object and the imaging situation from the storage unit 3, and transmits this imaging condition information via the transmission/reception unit 201 to the mobile telephone 100.

The mobile telephone receives imaging condition information from the server 200 via the transmission/reception unit 101, and the imaging condition setting unit 5 sets the imaging condition to the image sensor 1 based upon imaging condition information received from the server 200.

Making such a configuration enables the present invention to be applied even to such a mobile telephone that has a limit to a storage capacity etc.

Example 2

An example 2 of the present invention will be explained.

As apparent from the above explanation, it is also possible to configure the mobile telephone 100 and the server 200 in the example 1 with hardware; however it is also possible to realize them with a computer program.

Figure 9:
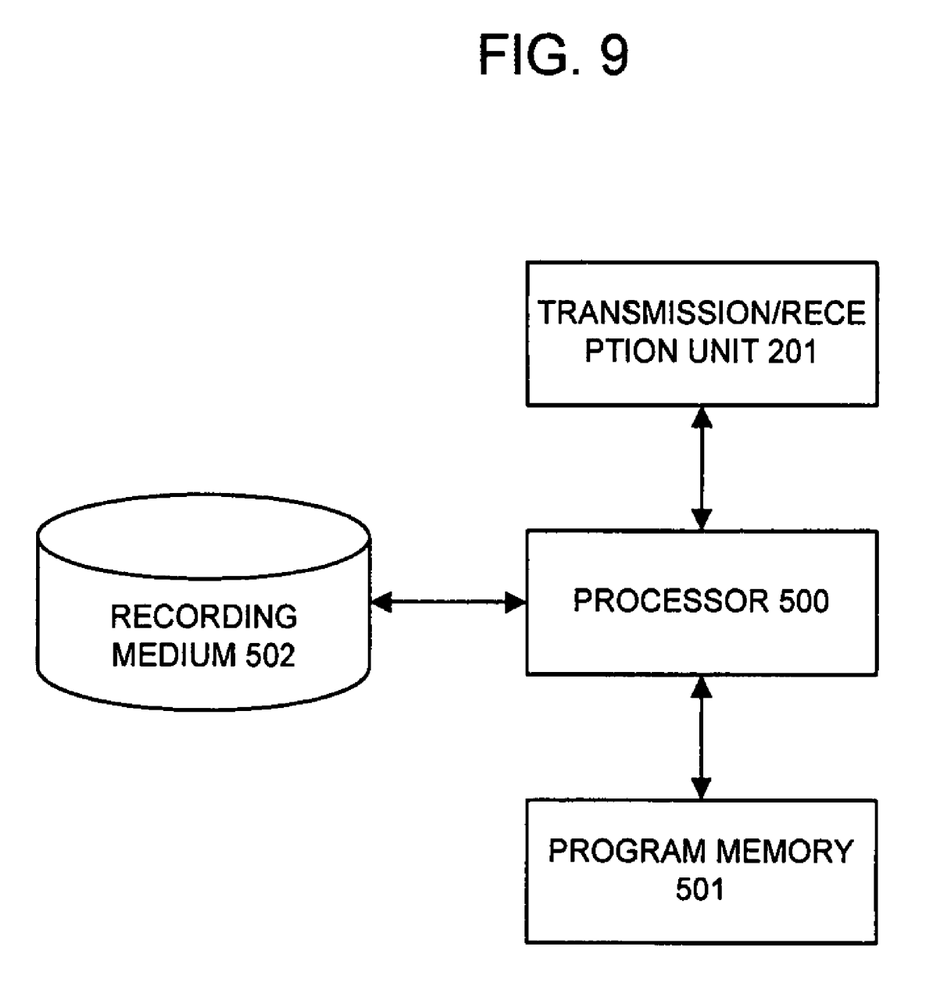
FIG. 9 is a view for explaining an outline of an example 2.

FIG. 9 is a general block configuration diagram of the information processing unit having one part of the server 200 implemented.

The information processing unit shown in FIG. 9 is comprised of a processor 500, a program memory 501, and a recording medium 502.

The recording medium 502 is equivalent to the storage unit 3, and the imaging information database 41 of the imaging information analysis unit 4 in the example 1. Additionally, the recording medium 502 may be a plurality of recording mediums, and may be a storage region that is comprised of an identical recording medium. The magnetic recording medium such as a hard disc can be employed as a recording medium.

The program memory 501 has a program contained for causing the processor 500 to perform the processes as the imaging information analysis unit 4 and the image processing unit 5 in the foregoing example 1, and this program allows the processor 500 to operate and the transmission/reception unit 201 to be instructed.

It does not matter that a configuration is made so that the processor 500 performs one part of the process of the transmission/reception unit 201.

As apparent from the above explanation, it is also possible to configure one part or the entirety of the hardware with a computer program.

Additionally, with the mobile telephone 100 as well, the entirety or one part of the hardware thereof can be realized with a computer program similarly to the server 200. In this case, the entirety or one part of the imaging information obtainment unit 2 is realized with the processor 500.

The invention claimed is:

1. An imaging system comprising:
storage means having a position information and an imaging object, and the imaging object and an imaging condition information for setting imaging condition of the imaging object, stored correspondingly;
imaging information obtainment means for obtaining an imaging position;
imaging means for, obtaining image data of the imaging object;
imaging information analysis means for analyzing the imaging position obtained in the imaging information obtainment means and comparing one object with another object to recognize an imaging object that corresponds to the analyzed position information from the storage means, and for obtaining imaging condition information that corresponds to the imaging object from the storage means; and
imaging condition setting means for, based upon the imaging condition information obtained in the imaging information analysis means, setting the imaging condition to the imaging means.

2. An imaging system comprising:
position information and an imaging object, and imaging condition information for setting an imaging condition, and an image object and an imaging situation, for which the imaging condition information is applied, stored correspondingly;

imaging information obtainment means for obtaining the imaging position and the imaging situation;

imaging means for, obtaining image data of the imaging object;

imaging information analysis means for analyzing the imaging position and the imaging situation obtained in the imaging information obtainment means and comparing one object with another object to recognize an imaging object and an imaging situation that correspond to the analyzed position information and the imaging situation from the storage means, and for obtaining imaging condition information that corresponds to the imaging object and the imaging situation from the storage means; and imaging condition setting means for, based upon the imaging condition information obtained in the imaging information analysis means, setting the imaging condition to the imaging means.

3. The imaging system according to claim 1 or claim 2, wherein the imaging information obtainment means is means for obtaining information of an imaging date.

4. The imaging system according to claim 1, wherein the imaging information obtainment means is means for obtaining information of weather at the time of imaging.

5. The imaging system according to claim 1, wherein the imaging information obtainment means is means for obtaining information of an imaging angle.

6. The imaging system according to claim 1, comprising:

storage means having image correction information for correcting image data stored;

imaging information analysis means for analyzing the imaging information obtained in the imaging information obtainment means, thereby to obtain image correction information of the image data from the storage means; and image processing means for, based upon the image correction information obtained in the imaging information analysis means, correction-processing the image data obtained in the imaging means.

7. An imaging system comprising:

a mobile terminal including:

imaging means for obtaining image data of the imaging object;

imaging information obtainment means for obtaining imaging position;

imaging condition setting means for, based upon transmitted imaging condition information, setting the imaging condition of the imaging means; and means for transmitting the imaging position obtained in the imaging information obtainment means;

and a server including:

storage means having an imaging object and an imaging condition information for setting imaging condition of the imaging object, stored correspondingly;

imaging information analysis means for receiving the imaging position from the mobile terminal, analyzing the received imaging position and comparing one object with another object to recognize an imaging object that corresponds to the analyzed position information, and obtaining imaging condition information that corresponds to the imaging object from the storage means; and transmission means for transmitting the imaging condition information obtained in the imaging information analysis means to the mobile terminal.

8. A server for transmitting imaging condition information for imaging to a terminal comprising:

storage means having an imaging object and an imaging condition information for setting imaging condition of the imaging object, stored correspondingly;

imaging information analysis means for receiving a imaging position that is transmitted from the terminal, analyzing the received imaging position and comparing one object with another object to recognize an imaging object that corresponds to the analyzed position information, and obtaining imaging condition information that corresponds to the imaging object from the storage means; and transmission means for transmitting the imaging condition information obtained in the imaging information analysis means to the terminal.

9. A non-transitory computer readable storage device storing program executed by an information processing unit for transmitting imaging condition information for imaging to a terminal, the program causing the information processing unit to function as:

imaging information analysis means for receiving imaging position that is transmitted from the terminal, analyzing the received imaging position and comparing one object with another object to recognize an imaging object that corresponds to the analyzed position information, and obtaining imaging condition information that corresponds to the imaging object from storage means that is stored imaging condition information for imaging; and transmission means for transmitting the imaging condition information obtained in the imaging information analysis means to the terminal.

\* \* \* \* \*